United States Patent
Kelly

(10) Patent No.: US 12,479,569 B2
(45) Date of Patent: Nov. 25, 2025

(54) AIRCRAFT WING ASSEMBLY INCLUDING HIGH LIFT DEVICE WITH AN OVERLAPPED CONNECTION POINT

(71) Applicant: Airbus Operations Limited, Bristol (GB)

(72) Inventor: Peter Kelly, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/522,419

(22) Filed: Nov. 29, 2023

(65) Prior Publication Data

US 2024/0174351 A1 May 30, 2024

(30) Foreign Application Priority Data

Nov. 29, 2022 (GB) ..................................... 2217919

(51) Int. Cl.
| | | |
|---|---|---|
| *B64C 9/02* | (2006.01) | |
| *B64C 3/18* | (2006.01) | |
| *B64C 9/24* | (2006.01) | |
| *B64C 13/50* | (2006.01) | |

(52) U.S. Cl.
CPC ................ *B64C 9/02* (2013.01); *B64C 3/185* (2013.01); *B64C 9/24* (2013.01); *B64C 13/50* (2013.01)

(58) Field of Classification Search
CPC .... B64C 3/28; B64C 9/02; B64C 9/22; B64C 9/24
See application file for complete search history.

(56) References Cited

U.S. PATENT DOCUMENTS

| | | | |
|---|---|---|---|
| 4,285,482 A | * | 8/1981 | Lewis ....................... B64C 9/24 244/210 |
| 4,469,297 A | | 9/1984 | Cole |
| 4,471,928 A | | 9/1984 | Cole |
| 4,687,162 A | | 8/1987 | Johnson et al. |
| 5,927,656 A | | 7/1999 | Hinkleman |
| 11,034,433 B2 | | 6/2021 | Bensmann |

(Continued)

FOREIGN PATENT DOCUMENTS

| | | |
|---|---|---|
| EP | 0045988 A1 | 2/1982 |
| EP | 3969362 A1 | 3/2022 |

(Continued)

OTHER PUBLICATIONS

British Search Report for Application No. 2217919 dated May 26, 2023.

(Continued)

*Primary Examiner* — Joshua D Huson
*Assistant Examiner* — Shanna Danielle Glover
(74) *Attorney, Agent, or Firm* — KDW Firm PLLC

(57) ABSTRACT

An aircraft wing assembly includes a wing box including an upper surface, a lower surface, and a leading edge structure connecting the upper surface to the lower surface and secured to the upper surface at a connection point. The aircraft wing assembly includes a drive mechanism secured to the wing box and a high lift device mounted to the drive mechanism. The drive mechanism is configured to move the high lift device between a retracted position and an extended position in use, and wherein the high lift device is configured to overlap the connection point when in the retracted position.

20 Claims, 6 Drawing Sheets

(56) References Cited

U.S. PATENT DOCUMENTS

| | | | |
|---|---|---|---|
| 11,427,302 B2 | 8/2022 | dos Santos Borges | |
| 2007/0102587 A1 | 5/2007 | Jones | |
| 2010/0065687 A1 | 3/2010 | Douglas | |
| 2013/0270392 A1* | 10/2013 | Derqui | B64C 23/00 |
| | | | 244/130 |
| 2015/0024160 A1* | 1/2015 | Georgeson | B32B 3/06 |
| | | | 156/60 |
| 2018/0155004 A1* | 6/2018 | Woolcock | B64C 3/26 |
| 2019/0092454 A1* | 3/2019 | Mortland | B64C 13/28 |
| 2019/0176960 A1* | 6/2019 | Mcnaught | B64C 3/28 |
| 2020/0148331 A1 | 5/2020 | Bensmann | |
| 2022/0396350 A1* | 12/2022 | Farouz-Fouquet | B64C 9/34 |

FOREIGN PATENT DOCUMENTS

| | | | |
|---|---|---|---|
| WO | 2021037981 A1 | 3/2021 | |
| WO | WO-2021099710 A1 * | 5/2021 | B64C 21/02 |

OTHER PUBLICATIONS

Partial European Search Report issued in European Application No. 23212980.9, mailed Apr. 25, 2024, 16 pages.

* cited by examiner

AIRCRAFT WING ASSEMBLY INCLUDING HIGH LIFT DEVICE WITH AN OVERLAPPED CONNECTION POINT

TECHNICAL FIELD

The disclosure herein relates to an aircraft, an aircraft wing assembly, and a method of assembling an aircraft wing assembly.

BACKGROUND

Aircraft wing assemblies can form an integrated part of a wing of an aircraft. For example, aircraft wing assemblies can comprise high lift devices to increase the amount of lift the wing can provide during flight of the aircraft.

SUMMARY

According to a first aspect of the disclosure herein, there is provided an aircraft wing assembly comprising: a wing box comprising: an upper surface; a lower surface; and a leading edge structure connecting the upper surface to the lower surface and secured to the upper surface at a connection point; a drive mechanism secured to the wing box; and a high lift device mounted to the drive mechanism, wherein the drive mechanism is configured to move the high lift device between a retracted position and an extended position in use, and wherein the high lift device is configured to overlap the connection point when in the retracted position.

The aircraft wing assembly according to the first aspect of the disclosure herein may provide improved aerodynamic performance over conventional wing assemblies. As the high lift device overlaps the connection point between the upper surface and the leading edge structure, there may be fewer fasteners (or the like) within the path of the airflow over the upper surface when the high lift device is in the retracted position, which may improve airflow, e.g. the laminarity of the airflow, over the upper surface. As the high lift device overlaps the connection point when in the retracted position, this may also reduce the need for strict tolerances for the connection between the leading edge structure and the upper surface, as any imperfection in the connection will be covered by the high lift device (so will not affect airflow when the high lift device is in the retracted position).

The leading edge structure may be secured to the upper surface using a fastener. The fastener may comprise a nut and bolt, or may comprise a rivet. In some examples the fastener comprises a single-sided fastener, such that the fastener is secured from a single-side.

The upper surface may comprise a recess to receive a portion of the high lift device when the high lift device is in the retracted position. The recess may help to reduce sudden steps between the high lift device and the upper surface, which may help to create a smooth surface transition between the leading edge structure and the upper surface. This may help to improve airflow over the upper surface and may improve the aerodynamic performance of the aircraft wing assembly.

The high lift device may be a droop or a flap, such as a Krueger flap.

The high lift device may comprise a slat. The slat may help to increase lift generated by the aircraft wing assembly. The slat may be moved between the extended position and the retracted position at different times of flight. For example, the slat may be moved to the extended position during take-off and/or landing and may be move to the retracted position during cruise and/or taxi.

The drive mechanism may be configured to move the high lift device so that the high lift device does not overlap the connection point when in the extended position. This may expose the connection point to airflow passing over the wing assembly structure in use, which may help to generate a turbulent airflow over the upper surface.

The wing box may comprise a spar located between the upper surface and the lower surface and secured at a first end to the upper surface and at a second end to the lower surface, and the drive mechanism may be removably secured to the spar. The spar may provide structural support to the upper surface and the lower surface. The spar may also seal a section of the wing box to form a fuel tank.

The aircraft wing assembly may comprise a support secured to the spar, and the drive mechanism may be secured to the support. The support may allow the drive mechanism to be secured to the spar without having to directly secure the drive mechanism to the spar. As such, it may be easier to install the drive mechanism once the spar is already in place, as direct access to the spar may not be required. This may also allow the drive mechanism to be secured to the spar from a single side of the spar, which may be easier and/or more convenient during assembly. The support may comprise aluminum, such as machined aluminum.

The aircraft wing assembly may comprise a plurality of supports secured to the spar, such as two supports, and the drive mechanism may be secured to the spar using the plurality of brackets. This may help to increase the strength of the connection between the drive mechanism and the spar. The drive mechanism may be secured to the support by a plurality of fasteners, such as nuts and bolts. This may allow the drive mechanism to be relatively easily removed for servicing and/or repair.

The support may be secured to the upper surface. Securing the support to the upper surface as well as the spar may help to transfer load to the upper surface in use. This may help to distribute load, which may reduce the likelihood of any part of the aircraft wing assembly encountering higher than desired loads.

The spar may comprise a first flange at the first end and a second flange at the second end, wherein the first flange extends in a first direction along the upper surface and the second flange extends in a second direction along the lower surface, the first direction being substantially opposite to the second direction. This may lead to the spar having a substantially Z-shaped cross-sectional shape when viewed from an end of the spar. The cross-sectional shape of the spar may allow the upper surface to be secured to the spar at a first side of the spar, and the lower surface to be secured to the spar at a second side of the spar. The shape of the spar may also allow relatively easy access to the first end and second end of the spar as the first end is not obstructed by the second end and vice versa. As such, the shape of the spar may make assembly of the aircraft wing assembly easier. The spar may comprise carbon fiber. This may provide a relative strong and light spar. The spar may extend along substantially the entire length of the upper surface and/or the lower surface.

The drive mechanism may be located such that no part of the drive mechanism extends through the spar. This may help to improve ergonomics of the aircraft wing assembly by only requiring access to a single side of the spar to inspect the drive mechanism, e.g. for service and/or repair.

The leading edge structure may comprise a curved sheet defining a fixed leading edge of the aircraft wing assembly. The curved sheet may comprise sheet metal which is bent into a desired shape. The curved sheet may comprise aluminum. Alternatively, the curved sheet may comprise a thermoplastic or a thermoset. The curved sheet may have a thickness of around 1 mm to 6 mm, such as between 1 mm and 4 mm, or between 1 mm and 2 mm. This may allow the fixed leading edge, and therefore the leading edge structure, to be relatively lightweight. This may help to reduce the overall weight of the aircraft wing assembly.

The leading edge structure may comprise a reinforcing element. This may help to increase the structural rigidity/strength of the leading edge structure, such that it less susceptible to deforming when under load.

The leading edge structure and/or the lower surface may comprise a removable access panel. This may allow access through the leading edge structure and/or the lower surface without having to remove the leading edge structure and/or the lower surface. This may make service and maintenance of the aircraft wing assembly quicker and easier than if the entire leading edge structure and/or lower surface is removed.

The drive mechanism may comprise an electric motor. The electric motor may allow for more precise control of the drive mechanism over conventional mechanical arrangement. If more than one drive mechanism is provided, each drive mechanism may comprise its own electric motor, which may allow for individual control and/or monitoring of each drive mechanism. The use of an electric motor may also reduce the number of ancillary components required in the aircraft wing assembly, such as hydraulic lines if hydraulics were used instead of electric motors.

The aircraft wing assembly may comprise a plurality of drive mechanisms, wherein the high lift device is mounted to each of the plurality of drive mechanisms. This may help to provide redundancy in the event that one of the drive mechanisms fails to operate correctly. This may also help to increase stability of the high lift device by providing multiple contact points. The aircraft wing assembly may comprise two, three or four drive mechanisms per high lift device.

The drive mechanism may comprise an actuable element which is moveable using a rack and pinion assembly. In use, a sprocket may be rotated which is turn drives the actuable element. The actuable element may comprise an elongate rod which is attached to the high lift device, such that rotation of the sprocket drives the high lift device between the extended and the retracted positions.

The drive mechanism may comprise a modular unit, for example comprising a housing within which constituent components of the drive mechanism are located. The drive mechanism may comprise a housing within which the electric motor, the actuable element, and the rack and pinion assembly, are located. The actuable element may extend partly out of the housing, and an extent to which the actuable element extends out of the housing may be variable, for example in response to the electric motor, to move the high lift device between the retracted position and the extended position.

According to a second aspect of the disclosure herein, there is provided a method of assembling an aircraft wing assembly, the method comprising: securing a spar to an upper surface of the aircraft wing assembly; securing a lower surface of the aircraft wing assembly to the spar; securing a drive mechanism to the spar such that no part of the drive mechanism passes through the spar; securing a leading edge structure to the upper surface and to the lower surface; and mounting a high lift device to the drive mechanism.

The method according to the second aspect of the disclosure herein may provide a relatively straightforward way in which to assemble the aircraft wing assembly. The method may provide a one-way assembly process which does not require the removal/disconnection of components once they have been secured. This may help to speed up the assembly process (e.g. reduce cycle time for assembly) and may reduce time taken disassembling and reassembling parts of the aircraft wing assembly. This may also help to reduce costs during assembly, e.g. by reducing material wasted as a result of needing to assemble and then disassemble components, and/or reducing time spent in assembly.

The method may comprise securing a rib of the aircraft wing assembly to the upper surface before securing the lower surface. This may allow ribs to be easily located and secured before the lower surface is secured. This may also provide better access to the ribs to install other devices/components within the wing assembly.

The method may comprise securing the spar to the upper surface prior to securing the lower surface to the spar. This may allow components of the aircraft wing assembly to the secured to the upper surface and/or the rib before the wing box is closed off with the lower surface. This may be useful when working on the aircraft wing assembly from an underside of the aircraft wing assembly (e.g. when installed on a rig or aircraft). Alternatively, the method may comprise securing the lower surface to the spar prior to securing the spar to the upper surface.

The method may comprise securing the leading edge structure to the upper surface and to the lower surface after securing the spar to the upper surface, securing the lower surface to the spar and securing the drive mechanism to the spar. This may allow the leading edge structure to only be secured once the rest of the aircraft wing assembly has been assembled. This may help with installing, e.g., the drive mechanism, as access to the spar is not restricted by the leading edge structure.

According to a third aspect of the disclosure herein, there is provided an aircraft wing assembly comprising: an upper surface; a lower surface; and a spar located between the upper surface and the lower surface and secured at a first end to the upper surface and at a second end to the lower surface, wherein the spar comprises a first flange at the first end and a second flange at the second end, wherein the first flange extends in a first direction along the upper surface and the second flange extends in a second direction along the lower surface, the first direction being substantially opposite to the second direction.

This may lead to the spar having a substantially Z-shaped cross-sectional shape when viewed from an end of the spar. The cross-sectional shape of the spar may allow the upper surface to be secured to the spar at a first side of the spar, and the lower surface to be secured to the spar at a second side of the spar. The shape of the spar may also allow relatively easy access to the first end and second end of the spar as the first end is not obstructed by the second end and vice versa. As such, the shape of the spar may make assembly of the aircraft wing assembly easier. The spar may comprise carbon fiber. This may provide a relative strong and light spar.

The aircraft wing assembly may comprise a support secured to the spar and a drive mechanism secured to the support. The support may allow the drive mechanism to be secured to the spar without having to directly secure the drive mechanism to the spar. As such, it may be easier to instal the drive mechanism once the spar is already in place. This may also allow the drive mechanism to be secured to the spar from a single side of the spar, which may be easier and/or more convenient during assembly. The support may comprise aluminum, such as machined aluminum.

The aircraft wing assembly may comprise a plurality of supports secured to the spar, such as two supports, and the drive mechanism may be secured to the spar using the plurality of brackets. This may help to increase the strength of the connection between the drive mechanism and the spar. The drive mechanism may be secured to the support by a plurality of fasteners, such as nuts and bolts. This may allow the drive mechanism to be relatively easily removed for servicing and/or repair.

The aircraft wing assembly may comprise a high lift device mounted to the drive mechanism. The high lift device may help to increase lift generated by the aircraft wing assembly in use.

The support may be secured to the upper surface. Securing the support to the upper surface as well as the spar may help to transfer load to the upper surface in use. This may help to distribute load, which may reduce the likelihood of any part of the aircraft wing assembly encountering higher than desired loads.

According to a fourth aspect of the disclosure herein, there is provided an aircraft comprising the aircraft wing assembly according to the first aspect of the disclosure herein or the third aspect of the disclosure herein.

Optional features of aspects of the disclosure herein may be equally applied to other aspects of the disclosure herein, where appropriate.

BRIEF DESCRIPTION OF THE DRAWINGS

Embodiments of the disclosure herein will now be described, by way of example only, with reference to the accompanying drawings noted below.

DETAILED DESCRIPTION

Figure 1:
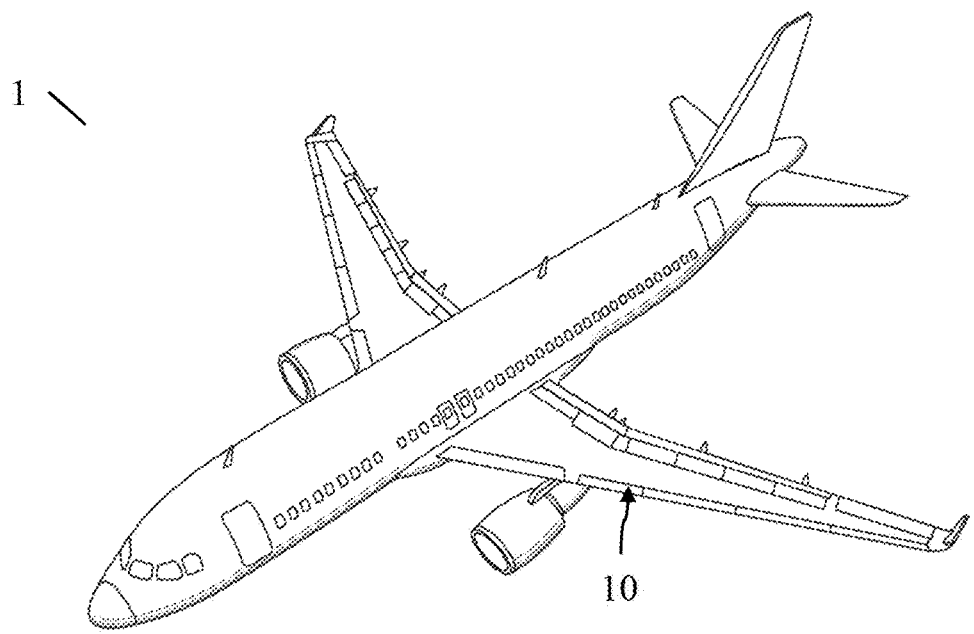
FIG. 1 shows a schematic view of an aircraft.

An aircraft 1 is shown schematically in FIG. 1. The aircraft 1 comprises an aircraft wing assembly 10.

Figure 2:
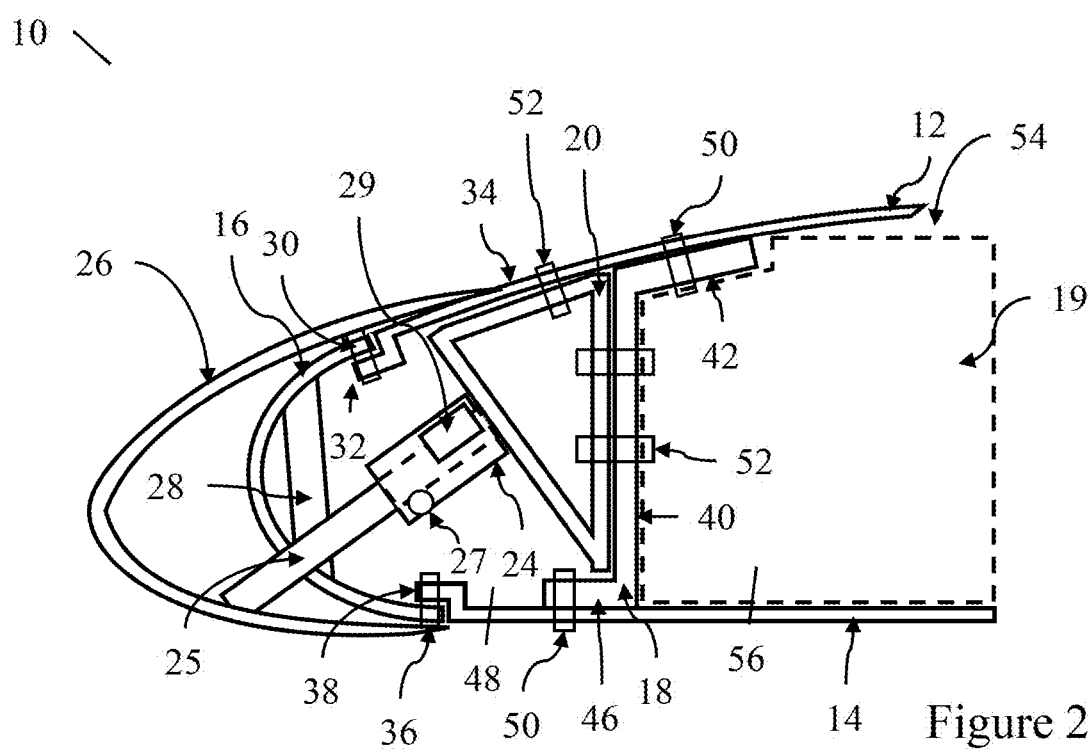
FIG. 2 shows a schematic cross-sectional view of an aircraft wing assembly of the aircraft of FIG. 1 with a slat in a retracted position.
Figure 3:
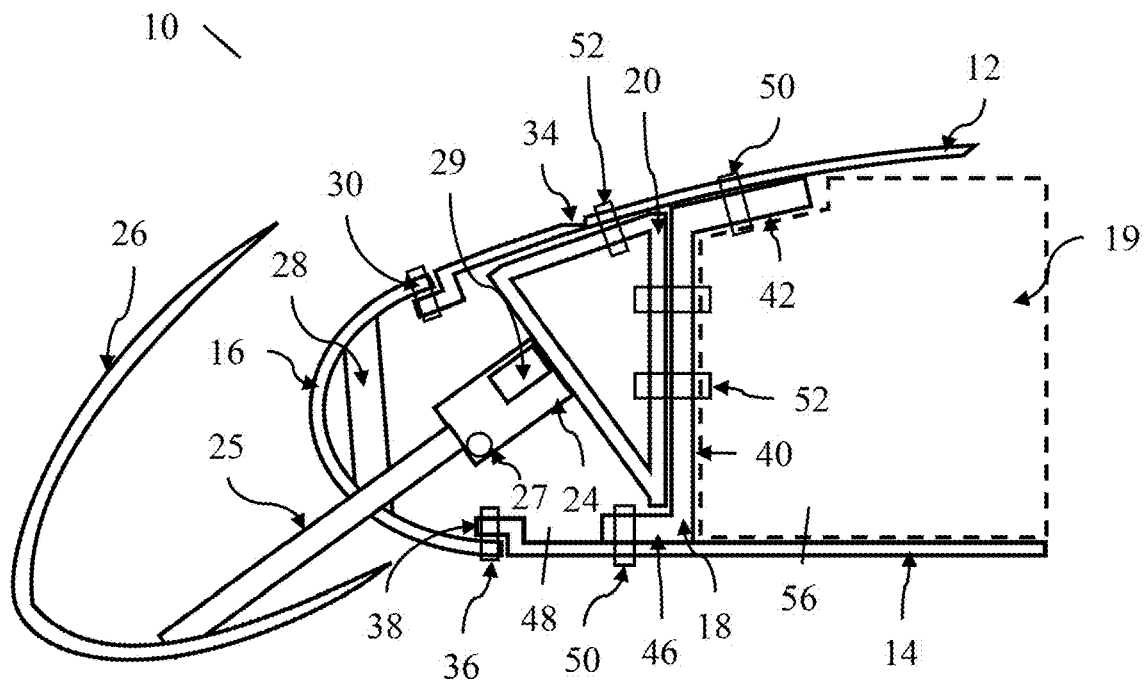
FIG. 3 shows a schematic cross-sectional view of the aircraft wing assembly of FIG. 2 with the slat in an extended position.

A cross-sectional side view of the aircraft wing assembly 10 is shown in FIGS. 2 and 3. The aircraft wing assembly 10 comprises an upper surface 12, a lower surface 14, a leading edge structure 16, a spar 18, a support 20 secured to the spar 18 and a rib 19. The upper surface 12, the lower surface 14, the leading edge structure 16 and the spar 18 collectively form a wing box. A drive mechanism 24 is secured to the support 20 and a slat 26 is mounted to the drive mechanism 24. The aircraft wing assembly 10 is shown with the slat 26 in a retracted position in FIG. 2, and in an extended position in FIG. 3.

The leading edge structure 16 comprises sheet metal which is bent into a desired shape for the leading edge structure 16. When the slat 26 is in the retracted position (as shown in FIG. 2), the leading edge structure 16 is covered by the slat 26, such that the leading edge structure 16 is not exposed to airflow passing over the aircraft wing assembly 10. When the slat 26 is in the extended position (as shown in FIG. 3), the leading edge structure 16 is exposed to the airflow passing over the aircraft wing assembly 10. When the slat 26 is in the extended position, the leading edge structure 16 may help to generate a turbulent flow over the upper surface 12. The leading edge structure 16 also comprises a reinforcing element 28 to strengthen the leading edge structure 16. The reinforcing element 28 comprises a rib, and it will be appreciated that a plurality of reinforcing elements 28, such as a plurality of ribs, may be utilized in practice.

The upper surface 12 is secured to the leading edge structure 16 with fasteners 30 (only one of which is shown in FIG. 2) which extend through the leading edge structure 16 and the upper surface 12. This creates a line of fasteners 30 along the upper surface 12 at a connection point between upper surface 12 and the leading edge structure 16. An end 32 of the upper surface 12 is shaped to accommodate the leading edge structure 16.

The upper surface 12 comprises a recess 34 which is shaped to receive a part of the slat 26 when the slat 26 is in the retracted position.

The leading edge structure 16 is secured to the lower surface 14 in a similar way as to the upper surface 16. Fasteners 36 extend through the lower surface 14 and the leading edge structure 16 to secure the leading edge structure 16 to the lower surface 14. As with the upper surface 12, an end 38 of the lower surface 14 is shaped where it is connected to the leading edge structure 16 to reduce the size of any step between surfaces of the leading edge structure 16 and the lower surface 14.

The fasteners 30, 36 used to secure the leading edge structure 16 to the upper surface 12 and to the lower surface 14 are removable, so that the leading edge structure 16 can be detached and re-attached if required. This may be useful in situations where inspection and/or maintenance of the leading edge structure 16 (or any other part of the aircraft wing assembly 10) is required, as it does not require the whole aircraft wing assembly 10 to be disassembled.

The spar 18 comprises carbon fiber, is located between the upper surface 12 and the lower surface 14, and extends along the upper surface 12 and lower surface 14. The spar 18 comprises a linear mid-portion 40 along with a first end portion 42 (or flange) at a first end of the spar 18 and a second end portion 46 (or flange) at a second end of the spar 18. The first and second end portions 42, 46 extend from the linear mid-portion 40 in substantially opposite directions along the upper surface 12 and the lower surface 14 respectively. This gives the spar 18 a substantially Z-shaped cross-sectional shape when viewed from an end of the spar 18 (from the opposite direction of FIGS. 2 and 3). The first end portion 42 is secured to the upper surface 12 and the second end portion 46 is secured to the lower surface 14 using fasteners 50 (only two of which are shown in FIGS. 2 and 3).

The spar 18 is set back from the ends 32, 38 of the upper surface 12 and the lower surface 14. This creates an opening between the end 32 of the upper surface 12 and the end 38 of the lower surface 14 on a first side 48 of the spar 18 (i.e. to the left of the spar 18 in FIGS. 2 and 3), through which additional components of the aircraft wing assembly 10 are installed. A cavity 54 is located on a second side 56 of the spar 18 (i.e. to the right of the spar 18 in FIGS. 2 and 3), within which the rib 19 is located. In some examples, fuel is stored within the cavity 54.

Figure 4:
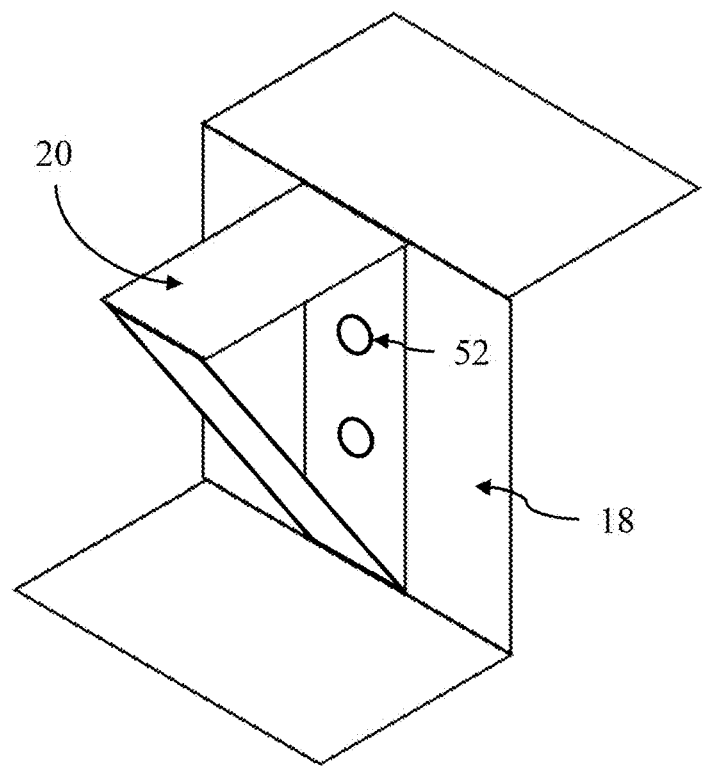
FIG. 4 shows an isometric view of a part of a spar of the aircraft wing assembly of FIG. 2.
Figure 5:
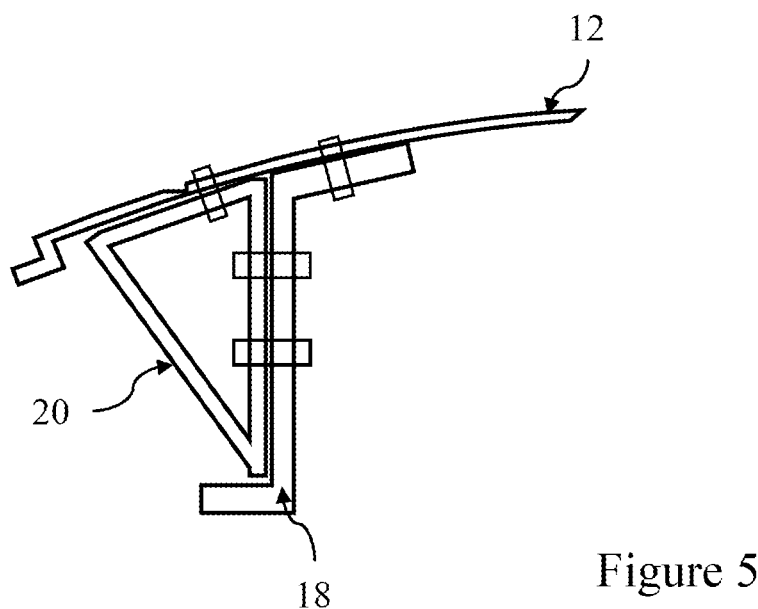
FIGS. 5 through 10 show schematic views of stages of assembling the aircraft wing assembly of FIG. 2.
Figure 6:
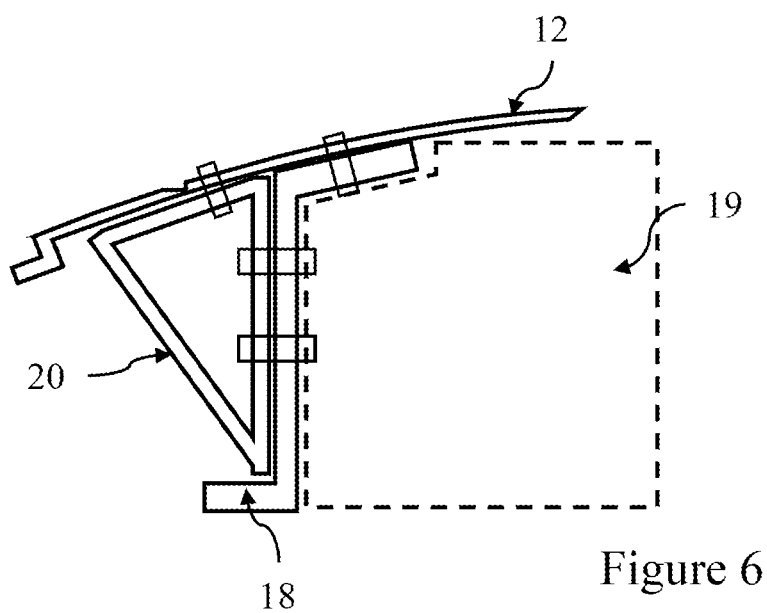
Figure 7:
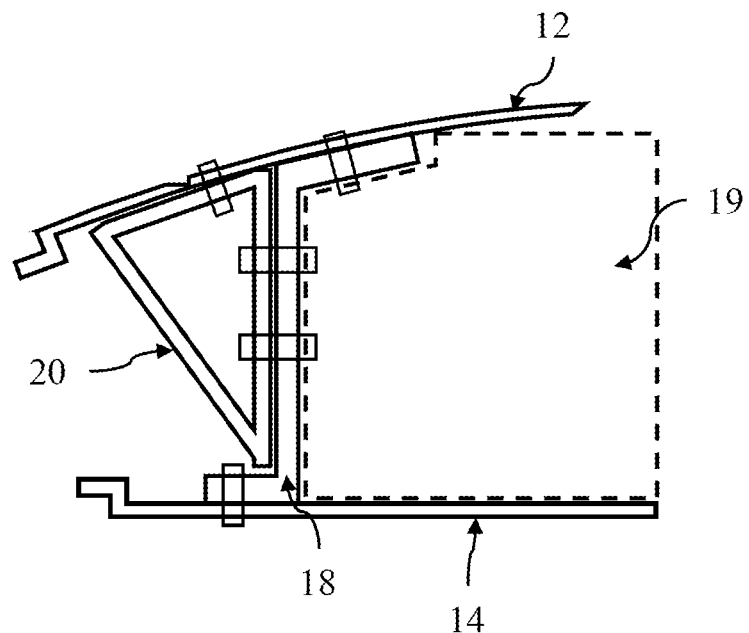

The support 20, shown in isolation with the spar 18 in FIG. 4, comprises aluminum and is located on the first side 48 of the spar 18 between the upper surface 12 and the lower surface 13. The support 20 has a substantially triangular cross-sectional shape and is secured to the spar 18 and the upper surface 12 by a plurality of fasteners 52. In FIGS. 2 and 3, two fasteners 52 are provided between the support 20 and the spar 18, and one fastener 54 is provided between the support 20 and the upper surface 12.

The drive mechanism 24 comprises an elongate arm 25 which is attached to the slat 26. Although illustrated as linear, the elongate arm 25 may be curved in practice, and may extend along a curved track within an interior of a housing of the drive mechanism 24. The drive mechanism 24 also comprises an electric motor 29 which drives a sprocket 27 within the drive mechanism 24. The arm 25 is driven by the sprocket 27, such that the arm 25 and sprocket 27 act as a rack and pinion arrangement. As the sprocket 27 rotates, the sprocket 27 engages with the arm 25 to either extend the arm 25 (and therefore the slat 26) or retract the arm 25 (and therefore the slat 26). The elongate arm 25, the sprocket 27, and the electric motor 29 are located within a common housing, such that the drive mechanism 24 is modular in nature. In particular, the drive mechanism 24 is fixed to the support 20 as a single modular unit, as will be described hereinafter.

In use, the drive mechanism 24 moves the slat 26 between the extended and the retracted position. In the retracted position, as shown in FIG. 2, the slat 26 covers the leading edge structure 16 as well as the fasteners 30 connecting the upper surface 12 to the leading edge structure 16. The slat 26 is kept in the retracted position while the aircraft 1 is at cruise or is taxiing (e.g. when increased lift and/or drag is not needed).

In the extended position, as shown in FIG. 3, the slat 26 is moved away from the leading edge structure 16 such that a part of the leading edge structure 16 is exposed. The slat 26 is moved to the extended position for take-off and/or landing (e.g. when increased lift and/or drag is desirable).

FIGS. 5 through 10 show the various stages of assembly of the aircraft wing assembly 10. Firstly, the spar 18 is secured to the upper surface 12 and the support 20 is secured to the spar 18 and the upper surface 12. The rib 19 (along with any other components to be installed within the cavity 54, such as stringers or conduits) is then installed in the aircraft wing assembly 10 (shown in FIG. 6). Following this, the lower surface 14 is secured to the spar 12 (shown in FIG. 7).

Figure 8:
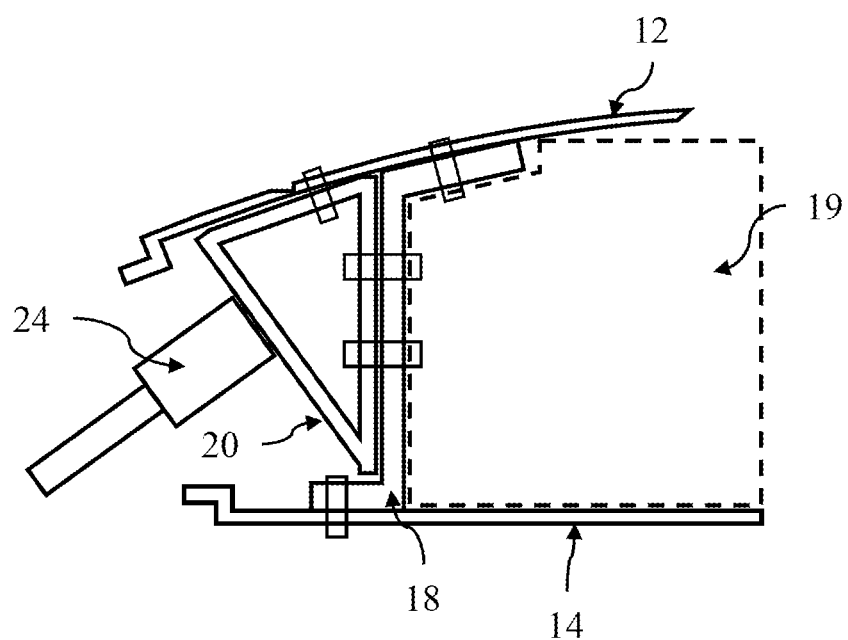
Figure 9:
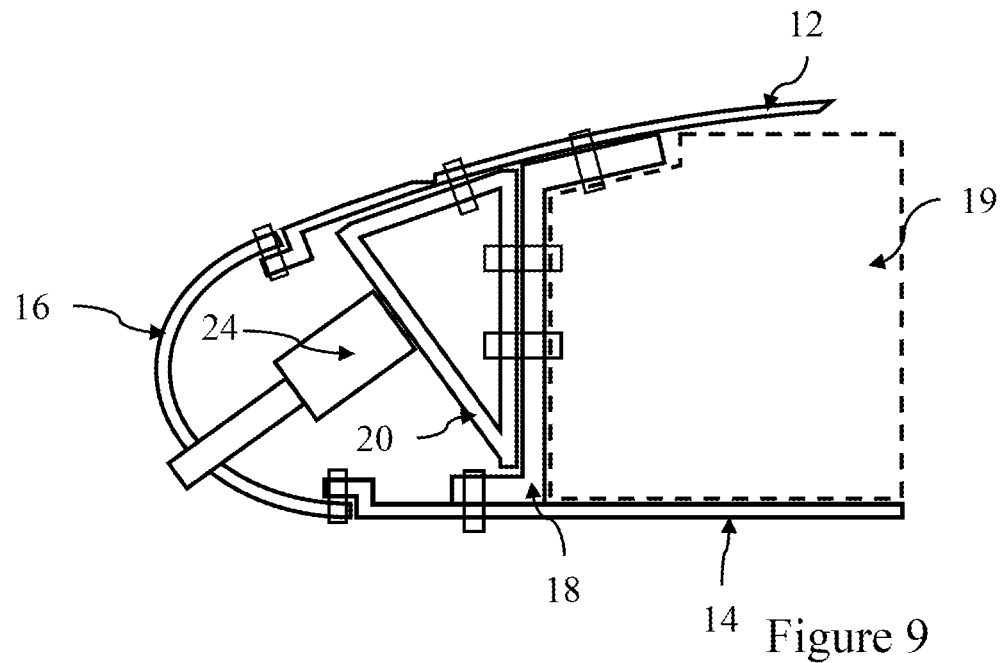

The drive mechanism 24 is secured, as a single modular unit, to the support 20 while the leading edge structure 16 is not attached to the aircraft wing assembly 10 (shown in FIG. 8). Given the modular nature of the drive mechanism 24, increased simplicity of attachment of the drive mechanism 24 to the support may be achieved in comparison to an arrangement where components of the drive mechanism 24 are required to be individually mounted. The drive mechanism 24 is secured to the support 20 without needing access to the cavity 54 on the second side 56 of the spar 18 (i.e. without having to remove the lower surface 14).

Figure 10:
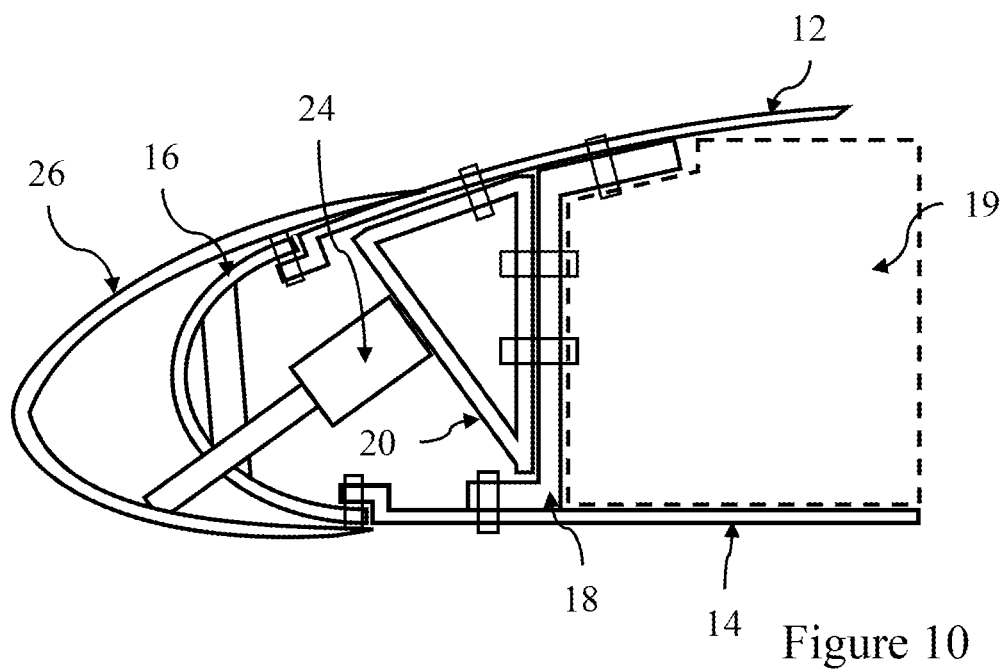

After the drive mechanism 24 is secured in place, the leading edge structure 16 is secured to the upper surface 12 and to the lower surface 14 (shown in FIG. 9), and the slat 26 is then mounted to the drive mechanism 24 (shown in FIG. 10).

Figure 11:
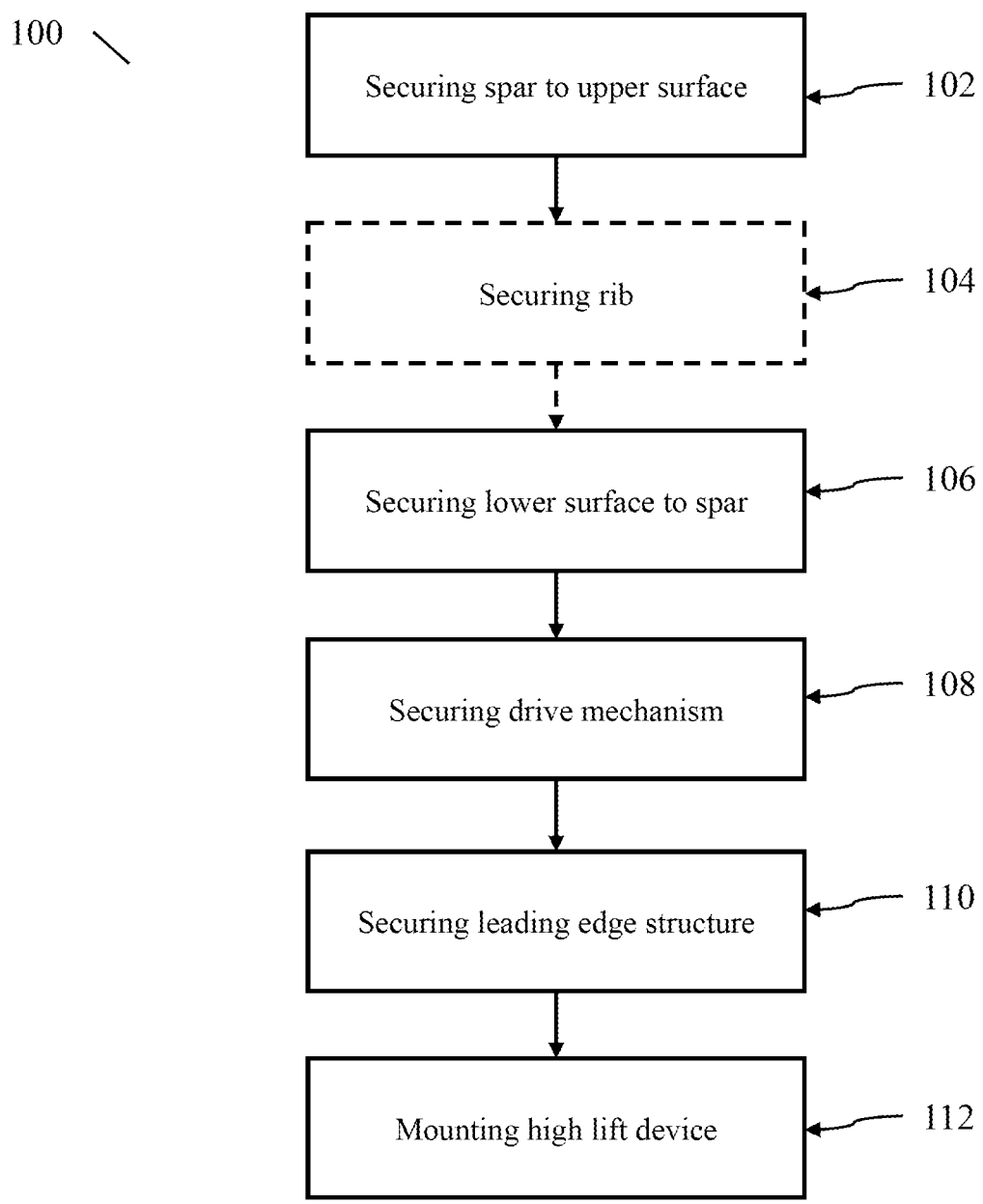
FIG. 11 shows a flow diagram of a method of assembling the aircraft wing assembly of FIG. 2.

FIG. 11 shows a flow chart of a method 100 of assembling the aircraft wing assembly 10 as described above in relation to FIGS. 5 through 10. The method 100 comprises securing 102 the spar 18 to the upper surface 12. The method 100 then comprises securing 104 the rib 19 to the upper surface 12. Once the rib 19 has been secured, the method 100 comprises securing 106 the lower surface 14 to the spar 18.

After the lower surface 14 has been secured to the spar 18, the method 100 comprises securing 108 the drive mechanism 24 to the spar 18 (such as via the support 20), securing 110 the leading edge structure 16 to the upper surface 12 and the lower surface 14, and mounting 112 the slat 26 to the drive mechanism 24.

In some examples, securing the rib 10 to the upper surface 12 also includes installing any additional components required to be located in the cavity 54. In other examples, the securing the rib to the upper surface 12 may be omitted.

The method 100 described above may provide a one-way assembly process which does not require the removal/disconnection of components once they have been secured. This may help to speed up the assembly process and may reduce time taken disassembling and reassembling parts of the aircraft wing assembly 10.

In the method 100 described above, the spar 18 and rib 19 are secured to the upper surface 12 before the lower surface 14 is secured to the spar 18, however, in other examples the spar 18 and/or the rib 19 may be secured to the lower surface 14 first, and then the upper surface 12 may be secured to the spar 18.

Although the aircraft wing assembly 10 described above comprises a slat 26, in other examples the aircraft wing assembly 10 comprises an alternative high lift device, such as a droop or flap (e.g. a Krueger flap). Moreover, although the slat 26 shown in FIGS. 2 and 3 does not cover the fastener 54 between the support 20 and the upper surface 12, in some examples the slat 26 also extends over the fastener 54 between the support 20 and the upper surface 12 when the slat 26 is in the extended position.

Although in the example of FIG. 2, the slat 26 extends past the end 38 of the lower surface 14 (and therefore past the leading edge structure 16) when the slat 26 is in the retracted position, in other examples the leading edge structure 16 extends further towards the spar 18 than the slat 26, to allow greater access to the first side 48 of the spar 18 when the leading edge structure 16 is removed.

It is to noted that the term "or" as used herein is to be interpreted to mean "and/or", unless expressly stated otherwise.

It should be understood that modifications, substitutions and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing assembly comprising:
    a wing box comprising:
        an upper surface;
        a lower surface;

a leading-edge structure connecting the upper surface to the lower surface and secured to the upper surface at a connection point;

a drive mechanism secured to the wing box; and a high lift device mounted to the drive mechanism, wherein the drive mechanism is configured to move the high lift device between a retracted position and an extended position in use; and wherein the high lift device overlaps the connection point when the high lift device is in the retracted position;

wherein the leading-edge structure is connected to the upper surface by one or more fasteners at the connection point; and wherein, in overlapping the connection point when in the retracted position, the high lift device extends over the upper surface, such that the one or more fasteners, the connection point, and at least a portion of the upper surface are covered by the high lift device.

2. The aircraft wing assembly according to claim 1, wherein the upper surface comprises a recess to receive a portion of the high lift device when the high lift device is in the retracted position.

3. The aircraft wing assembly according to claim 1, wherein the high lift device comprises a slat.

4. The aircraft wing assembly according to claim 1, wherein:

the wing box comprises a spar that is located between the upper surface and the lower surface;

a first end of the spar is secured to the upper surface and a second end of the spar is secured to the lower surface; and the drive mechanism is removably secured to the spar.

5. The aircraft wing assembly according to claim 4, wherein:

the spar comprises, at the first end, a first flange and, at the second end, a second flange;

the first flange extends in a first direction along the upper surface;

the second flange extends in a second direction along the lower surface;

the first direction is substantially opposite to the second direction.

6. The aircraft wing assembly according to claim 4, wherein the drive mechanism is located such that no part of the drive mechanism extends through the spar.

7. The aircraft wing assembly according to claim 4, comprising:

a support secured to the spar;

wherein the drive mechanism is secured to the support.

8. The aircraft wing assembly according to claim 7, wherein the support is secured to the upper surface.

9. The aircraft wing assembly according to claim 1, wherein the leading-edge structure comprises a curved sheet defining a fixed leading-edge of the aircraft wing assembly.

10. The aircraft wing assembly according to claim 9, wherein the curved sheet has a thickness of between around 1 millimeter (mm) and 6 mm.

11. The aircraft wing assembly according to claim 9, wherein the leading-edge structure comprises a reinforcing element.

12. The aircraft wing assembly according to claim 1, wherein the drive mechanism comprises an electric motor.

13. The aircraft wing assembly according to claim 1, wherein:

the wing box comprises at least one further drive mechanism, such that the wing box has a plurality of drive mechanisms; and the high lift device is mounted to each of the plurality of drive mechanisms.

14. A method of assembling an aircraft wing assembly, the method comprising:

connecting, using a leading-edge structure, an upper surface of a wing box of the aircraft wing assembly to a lower surface of the wing box of the aircraft wing assembly;

securing the structure to the upper surface at a connection point;

securing a drive mechanism to the wing box;

mounting a high lift device to the drive mechanism; and moving, using the drive mechanism, the high lift device between a retracted position and an extended position in use;

wherein the high lift device overlaps the connection point when the high lift device is in the retracted position;

wherein the leading-edge structure is connected to the upper surface by one or more fasteners at the connection point; and wherein, in overlapping the connection point when in the retracted position, the high lift device extends over the upper surface, such that the one or more fasteners, the connection point, and at least a portion of the upper surface are covered by the high lift device.

15. The method according to claim 14, comprising securing a rib of the aircraft wing assembly to the upper surface before securing the lower surface of the aircraft wing assembly to the spar.

16. An aircraft comprising the aircraft wing assembly according to claim 1.

17. An aircraft wing assembly comprising:

a wing box comprising:

an upper surface;

a lower surface;

a spar located between the upper surface and the lower surface and secured, at a first end of the spar, to the upper surface and, at a second end of the spar, to the lower surface;

a leading-edge structure connecting the upper surface to the lower surface and secured to the upper surface at a connection point;

a drive mechanism secured to the wing box; and a high lift device mounted to the drive mechanism, wherein the drive mechanism is removably secured to the spar and configured to move the high lift device between a retracted position and an extended position in use, and wherein the high lift device is configured to overlap the connection point when in the retracted position; and a support secured to the upper surface and to the spar, wherein the drive mechanism is secured to the support.

18. The aircraft wing assembly according to claim 17, wherein:

the spar comprises, at the first end, a first flange and, at the second end, a second flange;

the first flange extends in a first direction along the upper surface;

the second flange extends in a second direction along the lower surface; and the first direction is substantially opposite to the second direction.

19. The aircraft wing assembly according to claim 17, wherein the drive mechanism is located such that no part of the drive mechanism extends through the spar.

20. The aircraft wing assembly according to claim 17, wherein the upper surface comprises a recess to receive a portion of the high lift device when the high lift device is in the retracted position.

* * * * *